(12) United States Patent
Mikes

(10) Patent No.: US 8,704,943 B2
(45) Date of Patent: Apr. 22, 2014

(54) SYSTEMS FOR MULTI-EXPOSURE IMAGING

(75) Inventor: Gabor Mikes, Oslo (NO)

(73) Assignee: Aptina Imaging Corporation, George Town (KY)

( * ) Notice: Subject to any disclaimer, the term of this patent is extended or adjusted under 35 U.S.C. 154(b) by 404 days.

(21) Appl. No.: 13/157,612

(22) Filed: Jun. 10, 2011

(65) Prior Publication Data
US 2012/0188439 A1 Jul. 26, 2012

Related U.S. Application Data

(60) Provisional application No. 61/435,197, filed on Jan. 21, 2011.

(51) Int. Cl.
H04N 5/238 (2006.01)
G03B 7/00 (2014.01)
H04N 5/235 (2006.01)

(52) U.S. Cl.
USPC .......................................... 348/363; 348/362

(58) Field of Classification Search
USPC .................................................. 348/362–368
See application file for complete search history.

(56) References Cited

U.S. PATENT DOCUMENTS

| 7,142,723 | B2 | 11/2006 | Kang et al. |
| 7,916,181 | B2 | 3/2011 | Nile'hn et al. |
| 2007/0103569 | A1* | 5/2007 | Kawahito ...................... 348/241 |
| 2010/0271512 | A1 | 10/2010 | Garten |
| 2011/0052095 | A1 | 3/2011 | Deever |

* cited by examiner

Primary Examiner — Sinh Tran
Assistant Examiner — Christopher K Peterson
(74) Attorney, Agent, or Firm — Trey Law Group; David C. Kellogg

(57) ABSTRACT

Systems and methods for multi-exposure imaging are provided. Multiple images may be captured having different exposure times. The multiple images may be processed to produce an output image. Multi-exposure images may be summed prior to linearization. Pixel values in multi-exposure images may be summed to nonlinear pixel values. The nonlinear pixel values may be linearized using one or more knee points. Multi-exposure imaging may be used to motion-intensive application such as automotive applications.

8 Claims, 3 Drawing Sheets

SYSTEMS FOR MULTI-EXPOSURE IMAGING

This application claims the benefit of provisional patent application No. 61/435,197, filed Jan. 21, 2011, which is hereby incorporated by reference herein in its entirety.

BACKGROUND

The present invention relates to multi-exposure imaging, and, in particular, to multi-exposure image processing.

Multi-exposure methods are often used to produce high dynamic range (HDR) images. Typically, multiple images are taken of the same scene using different exposure times, which are later combined during image processing. Typically, pixels from short-exposure images may be selected for brightly-lit areas while pixels from long-exposure images may be selected for poorly-lit areas.

In certain applications, such as automotive applications, there may be a great deal of motion in the scenes that are to be captured. In such cases, the multiple images that are captured in during multi-exposure imaging may be very different and may be difficult to combine using conventional methods.

Automotive applications can include machine-vision such as using processing equipment to detect road edges, read road signs, or detect oncoming traffic. Conventional multi-exposure image processing can produce false edges. As machine-vision relies on edge detection, false edges can be very detrimental.

It may therefore be desirable to have improved methods for processing multiple-exposure images.

DETAILED DESCRIPTION

In applications where there is a great deal of motion, it may be difficult to combine multi-exposure images using conventional methods because the multi-exposure images (also known as multiple-exposure images) may vary greatly as they are captured at different times. For example, application such as automotive applications may involve motion. For example, a camera in an automobile may capture a rear view to assist a driver with parking, or a camera in an automobile may capture views of potential blind spots for a driver.

It may be acceptable to have a certain amount of blurring in an image. In such applications, multi-exposure images may be processed using methods that do not involve selecting pixel values between different exposures.

Multi-exposure images may be summed prior to linearization. Pixel values in multi-exposure images may be summed to nonlinear summed values. The nonlinear summed values may be linearized according to one or more knee points.

During image processing, multi-exposure images may be processed using methods that approximate lateral overflow pixels. Such methods may be known as "lateral overflow" approximations.

Figure 1:
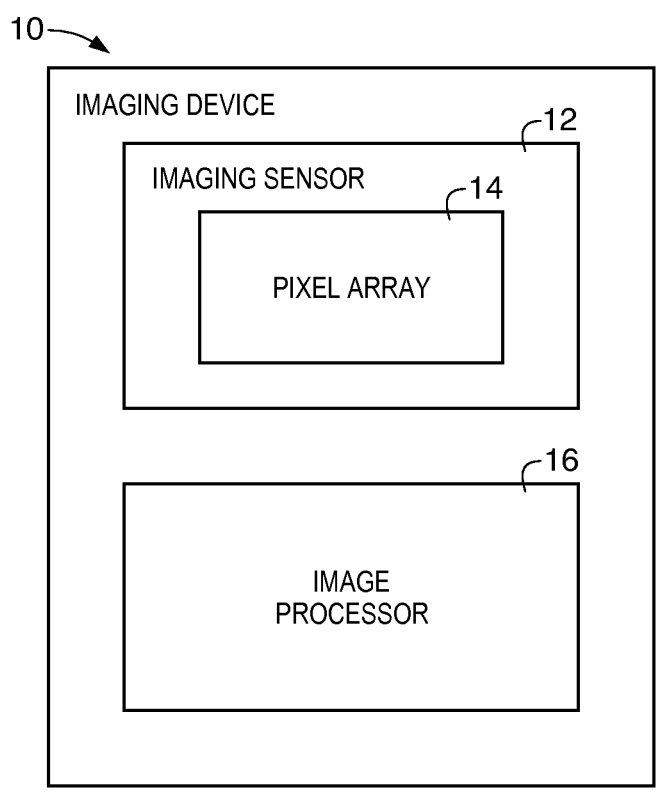
FIG. 1 is a diagram showing an imaging device in accordance with an embodiment of the present invention.

FIG. 1 is a diagram of an imaging device such as imaging device 10. Imaging device 10 may have an image sensor 12. Image sensor 12 may capture images using pixel array 14. Pixel array 14 may have pixels arranged in rows and columns. An image captured by pixel array 14 may have a pixel value for each pixel. Image processor 16 may process images captured by image sensor 12. Image processor 16 may be located on an integrated circuit together with image sensor 12. If desired, image processor 16 and image sensor 14 may be located on different integrated circuits. Imaging device 10 may be a camera that is installed in an automobile.

Figure 2:
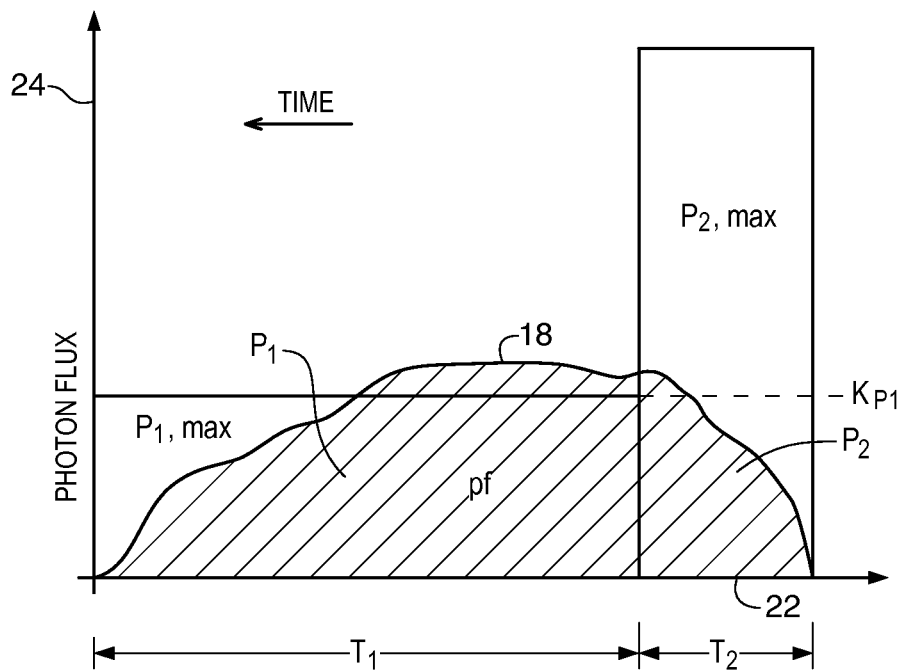
FIG. 2 is a diagram showing how two multi-exposure images may capture a moving scene in accordance with an embodiment of the present invention.

FIG. 2 is a diagram of photon flux versus time in an example of two multi-exposure images. Curve 18 may represent photon flux from a moving object. The horizontal axis 22 is time and the vertical axis 24 is photon flux. Area pf represents an area under curve 18. The horizontal axis of FIG. 2 is divided into time intervals $T_1$ and $T_2$, which represent exposure times for first and second images, respectively. In the example of FIG. 2, the exposure time $T_1$ is longer than exposure time $T_2$. Exposure times are often known as integration times. In general, any suitable number of exposures may be used, such as two exposures, three exposures, four exposures, or five or more exposures. Time may increase from right to left on the horizontal axis 22, as indicated by arrow 20.

Pixels are more easily saturated during long exposure times than short exposure times. Maximum pixel signal $P_{1,max}$ is an area represented by integration time $T_1$ multiplied by a photon flux level that would saturate image sensor 12 if the photon flux level were constant. Curve 18 may exceed the "maximum" photon flux level during portions of time $T_1$ and not saturate image sensor 12 as long as the area under curve 18 during time $T_1$ is not greater than maximum pixel signal $P_{1,max}$. Area $P_{2,max}$ may represent a maximum pixel signal that would saturate image sensor 12 during time $T_2$. An area under line $Kp_1$ may be a knee point.

An area under photon flux curve 18 during time $T_1$ may be known as pixel signal $P_1$. An area under photon flux curve 18 during time $T_2$ may be known as pixel signal $P_2$.

A first image may have an array of pixel signals $P_1$. A second image may have an array of pixel signal $P_2$. Pixel signals may also be known as pixel values. Exposure times may also be known as integration times.

Pixel values from multi-exposure images, such as pixel values $P_1$ and $P_2$ may be summed to produce summed pixel values $P_{lo}$. For two multi-exposure images, summed pixel values $P_{lo}$ may be given as:

$$P_{lo} = P_1 + P_2 \qquad (1)$$

Summed pixel values $P_{lo}$ may be considered to be nonlinear pixel values as a result of the multi-exposure pixel values $P_1$ and $P_2$ being obtained at different exposure times.

Figure 3:
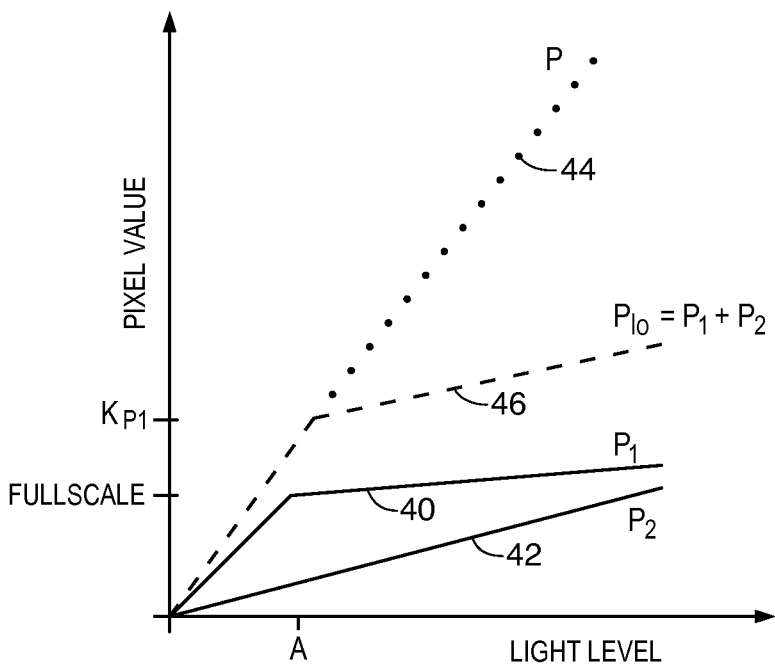
FIG. 3 is a plot showing image processing of two-multi-exposure images in accordance with an embodiment of the present invention.

The diagram of FIG. 3 shows a plot of pixel value on a vertical axis versus light level on a horizontal axis. Pixel values $P_1$, having a longer integration time may reach saturation after a certain maximum light level, as shown by curve 40. This maximum light level is denoted as point A on the plot of FIG. 3. The maximum value of $P_1$ may be known as fullscale on the vertical axis. Pixel values $P_2$, having a shorter integration time, may have a linear response over a larger light level range, as shown by curve 42. Summed pixel values $P_{lo}$ may be nonlinear and may have a kink at point A on the horizontal axis and knee point $Kp_1$ on the vertical axis. Summed pixel values $P_{lo}$ may be nonlinear may be said to be nonlinear with respect to changing light levels. Summed pixel values $P_{lo}$ are shown by curve 46 on FIG. 3.

The knee point may be given as;

$$Kp_1 = \text{fullscale} \cdot \left(1 + \frac{1}{g}\right) \quad (2)$$

where exposure ratio g may be given as $g=T_1/T_2$ and is a ratio between exposure times of the first and second image. The scale fullscale may be a scale of an image sensor such as image sensor 12. The scale fullscale may be substantially the same as a scale of an analog-to-digital converter (ADC) of image sensor 12. The scale fullscale may be substantially the same as a maximum pixel signal $P_{1,max}$ of FIG. 2. The scale fullscale may have any suitable value, such as 4096 least significant bits (lsb), or more than 4096 lsb.

Summed pixel values $P_{lo}$, as shown by curve 46, may be linearized to produce linearized pixel values P, as shown by curve 44 on FIG. 3. Summed pixel values $P_{lo}$ may be linearized according to:

$$\text{for } P_{lo} < Kp_1, P = P_{lo} \quad (3)$$

$$\text{for } P_{lo} \leq Kp_1, P = Kp_1 + (P_{lo} - Kp_1) \cdot (g+1) \quad (4)$$

As shown by equation (3), pixel values $P_{lo}$ that are less than or below knee point $Kp_1$ may be unaffected by the linearization. Pixel values $P_{lo}$ that are greater than or equal to knee point $Kp_1$ may be scaled using factor of g+1.

Figure 4:
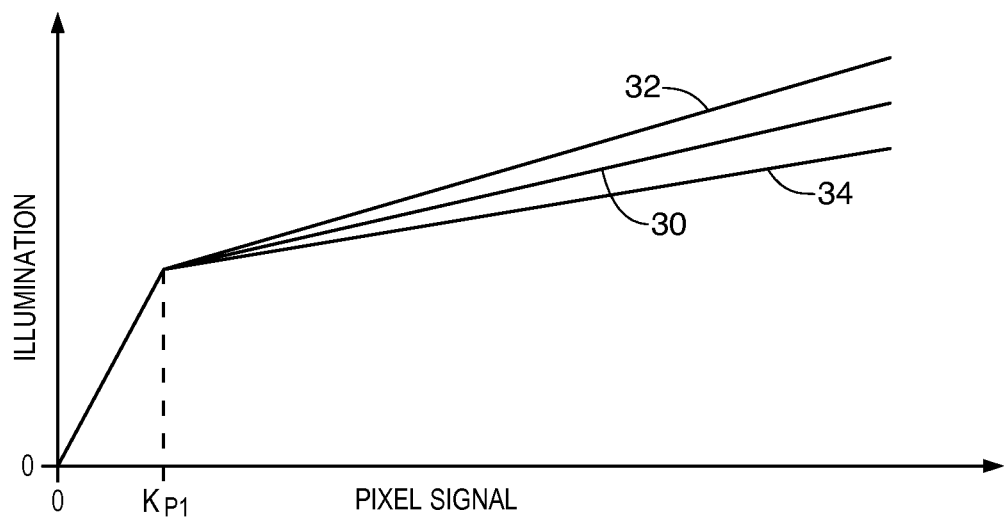
FIG. 4 is a plot showing summed pixel values under different motion conditions in accordance with an embodiment of the present invention.

Motion may affect the values of summed pixel signals. FIG. 4 shows a plot of pixel signals. The vertical axis represents illumination and the horizontal axis represents pixel signal. Curve 30 represents summed pixel values $P_{lo}$ when there is no motion in the image. Summed pixel values $P_{lo}$ may resemble curve 32 if there is stronger flux in $T_2$ than an average for $T_1$ and $T_2$. A pixel signal may resemble curve 34 if there is less flux in $T_2$ than an average for $T_1$ and $T_2$.

Figure 5:
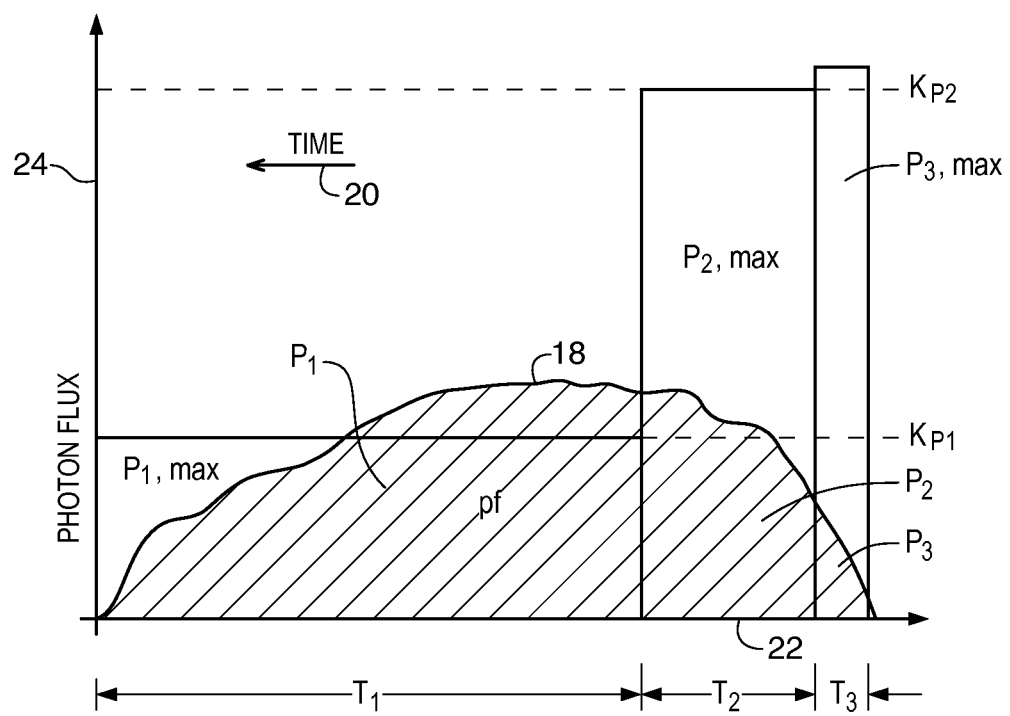
FIG. 5 is a diagram showing how three multi-exposure images may capture a moving scene in accordance with an embodiment of the present invention.

In the diagram of FIG. 5, an example is shown having three multi-exposure images. Curve 18 represents photon flux (on the vertical axis 24) from an illustrative moving scene. Area pf represents an area under curve 18. The horizontal axis 22 of FIG. 5 represents time. The horizontal axis of FIG. 5 is divided into time intervals $T_1$, $T_2$, and $T_3$, which represent exposure times. In the example of FIG. 5, the exposure time $T_1$ is the longest of the three exposure times and exposure time $T_3$ is the shortest of the three exposure times.

The rectangular region $P_{1,max}$ represents the maximum pixel signal that would saturate an illustrative image sensor, such as image sensor 12 of FIG. 1. The rectangular region $P_{2,max}$ may represent a maximum pixel signal for the second image having exposure time $T_2$. The rectangular region $P_{3,max}$ may represent a maximum pixel signal that would saturate image sensor 12 during time $T_3$. Time may increase from right to left on the horizontal axis 22, as indicated by arrow 20.

An area under photon flux curve 18 that is within time $T_1$ may be known as pixel signal $P_1$. An area under photon flux curve 18 that is within time $T_2$ may be known as pixel signal $P_2$. An area under photon flux curve 18 that is within time $T_3$ may be known as pixel value $P_3$.

Summed pixel values $P_{lo}$ maybe given as:

$$P_{lo} = P_1 + P_2 + P_3 \quad (5)$$

A first knee point $Kp_1$ may be given as:

$$Kp_1 = \text{fullscale} \cdot \left(1 + \frac{1}{g_1} + \frac{1}{g_1 \cdot g_2}\right) \quad (6)$$

A second knee point $Kp_2$ may be given as:

$$Kp_2 = \text{fullscale} \cdot \left(2 + \frac{1}{g_2}\right) \quad (7)$$

Exposure ratios $g_1$ and $g_2$ may be given as $g_1 = T_1/T_2$ and $g_2 = T_2/T_3$.

Linearized pixel signal P may be given as:

$$P = \begin{cases} P_{lo} & P_{lo} \leq Kp_1 \\ Kp_1 + (P_{lo} - Kp_1) \cdot (g_1 + 1) & \text{if } Kp_1 < P_{lo} \leq Kp_2 \\ Kp_1 + (Kp_2 - Kp_1) \cdot g_1 + \\ (P_{lo} - Kp_2) \cdot (g_1 \cdot g_2 + 1) & P_{lo} > Kp_2 \end{cases} \quad (8)$$

The signal-to-noise ratio may be given as;

$$SNR = \frac{P_1 + P_2 + P_3}{\sqrt{\sigma_1^2 + \sigma_1^2 + \sigma_3^2 + \sigma_r^2 + \sigma_r^2 + \sigma_r^2}} \quad (5)$$

Various embodiments have been described illustrating multiple-exposure image processing.

An image sensor may be used to capture multiple images of a scene at different exposure times. An image processor may process and combine the multiple images.

Pixel signals from multi-exposure images may be summed prior to linearization. Summed pixel values may be known as pixel values $P_{lo}$. Where two input images are used, $P_{lo} = P_1 + P_2$, where pixel values $P_1$ are from a first input image and pixel values $P_2$ are from a second input image. Where three input images are used, $P_{lo} = P_1 + P_2 + P_3$, where pixel values $P_3$ are from a third input image. Any suitable number of multi-exposure images may be used.

One or more knee points may be determined. A first knee point may be given as $Kp_1 = \text{fullscale}*(1+1/g_1)$, where $g_1$ is an exposure ratio between a first image and a second image. The range fullscale may be a scale of an image sensor or a scale of an analog-to-digital converter in an image sensor. The first image may have the longest exposure time of the multiple images. For summed pixel values below a first knee point, the summed pixel values $P_{lo}$ may be used as pixel values P in the linearized image. For summed pixel values $P_{lo}$ above a first knee point, the summed pixel values may be scaled to produce corresponding pixel values in the linearized image. Summed pixel values $P_{lo}$ above a first knee point may be scaled according to: $P = Kp_1 + (P_{lo} - Kp_1) \cdot (g+1)$ to produce pixels P for the linearized image.

A second knee point may be determined when there are two or more input images. A second knee point may be given as $$Kp_2 = \text{fullscale} \cdot \left(2 + \frac{1}{g_2}\right),$$

where $g_2$ may be a ratio between a second input image and a third input image. The second input image may have an exposure time greater than an exposure time of the third image.

Multi-exposure image capture and processing may be used in video application such as automotive applications. Images sensors and image processors used for multi-exposure imaging may be incorporated into automobiles.

The foregoing is merely illustrative of the principles of this invention which can be practiced in other embodiments.

What is claimed is:

1. A method for multi-exposure imaging, comprising:
with an image sensor, capturing a first image having a first exposure time;
with the image sensor, capturing a second image having a second exposure time that is less than the first exposure time;
with an image processor, processing the first and second images to produce a processed image, wherein processing the first and second images comprises adding pixel signals $P_1$ from the first image to pixel signals $P_2$ from the second image to produce summed pixel signals $P_{lo}$;
with the image processor, linearizing the summed pixel signals $P_{lo}$ to produce pixel signals P in the processed image, wherein linearizing the summed pixel signals $P_{lo}$ comprises scaling the summed pixel signals $P_{lo}$ that are above a knee point, wherein scaling the summed pixel signals $P_{lo}$ that are above a knee point comprises scaling the summed pixel signals $P_{lo}$ that are above a knee point by a factor, wherein the factor comprises an exposure ratio g plus one and wherein the exposure ratio g comprises the first exposure time divided by the second exposure time.

2. The method defined in claim 1, wherein the image sensor has an associated scale, and wherein the knee point comprises the associated scale multiplied by $(1+1/g)$.

3. A method for multi-exposure imaging, comprising:
with an image sensor, capturing a first image having a first exposure time;
with the image sensor, capturing a second image having a second exposure time that is less than the first exposure time; and
with an image processor, processing the first and second images to produce a processed image, wherein processing the first and second images comprises adding pixel signals $P_1$ from the first image to pixel signals $P_2$ from the second image to produce summed pixel signals $P_{lo}$, wherein, for summed pixel signals $P_{lo}$ below a knee point Kp, pixel signals P in the processed image are $P_{lo}$, wherein, for summed pixel signals above the knee point Kp, pixel signals P in the processed image comprise $Kp+(P_1+P_2-Kp)*(g+1)$, wherein g is an exposure ratio comprising the first exposure time divided by the second exposure time.

4. A method for multi-exposure imaging, comprising:
with an image sensor, capturing a plurality of images having different exposure times;
with an image processor, processing the plurality of images to produce a processed image, wherein processing the plurality of images to produce a processed image comprises adding pixel signals from the plurality of images to produce summed pixel signals $P_{lo}$, wherein processing the plurality of images to produce the processed image further comprises linearizing the summed pixel signals $P_{lo}$ to produce linearized pixel signals P, wherein linearizing the summed pixel signals $P_{lo}$ comprises linearizing the summed pixel signals $P_{lo}$ using a knee point, wherein the plurality of images comprises at least first, second, and third images, wherein $g_1$ is an exposure ratio between the first and second images, wherein $g_2$ is an exposure ratio between the second and third images, wherein the knee point comprises a scale of the image sensor multiplied by $(1+1/g_1+1/g_2)$, and wherein linearizing the summed pixel signals $P_{lo}$ further comprises linearizing the summed pixel signals $P_{lo}$ using an additional knee point.

5. A method for multi-exposure imaging, comprising:
with an image sensor, capturing a plurality of images having different exposure times;
with an image processor, processing the plurality of images to produce a processed image, wherein processing the plurality of images to produce a processed image comprises adding pixel signals from the plurality of images to produce summed pixel signals $P_{lo}$, wherein processing the plurality of images to produce the processed image further comprises linearizing the summed pixel signals $P_{lo}$ to produce linearized pixel signals P, wherein linearizing the summed pixel signals $P_{lo}$ comprises linearizing the summed pixel signals $P_{lo}$ using a knee point, wherein the plurality of images comprises at least first, second, and third images, wherein $g_1$ is an exposure ratio between the first and second images, wherein $g_2$ is an exposure ratio between the second and third images, wherein the knee point comprises a scale of the image sensor multiplied by $(1+1/g_{1+1}/g_2)$, and wherein linearizing the summed pixel signals $P_{lo}$ further comprises comparing the summed pixel signals $P_{lo}$ with an additional knee point, wherein the additional knee point comprises the scale of the image sensor multiplied by $(2+1/g_2)$.

6. An imaging device, comprising:
an image sensor that captures a plurality of images having different exposure times; and
an image processor that produces a summed image having summed pixel signals $P_{lo}$ by adding the plurality of images, wherein the image processor linearizes the summed pixel signals $P_{lo}$, wherein the plurality of images comprise first and second images, wherein the summed pixel signals $P_{lo}$ have a knee point Kp given by $$Kp = fullscale \cdot \left(1 + \frac{1}{g}\right),$$

by wherein g is an exposure ratio between the first and second images, and wherein fullscale is a scale of the imaging device.

7. An imaging device, comprising:
an image sensor that captures a plurality of images having different exposure times; and
an image processor that produces a summed image having summed pixel signals $P_{lo}$ by adding the plurality of images, wherein the image processor linearizes the summed pixel signals $P_{lo}$, wherein the plurality of images comprise first, second, and third images, wherein the pixel signals $P_{lo}$ have a knee point Kp given by $$Kp_1 = fullscale \cdot \left(1 + \frac{1}{g_1} + \frac{1}{g_1 \cdot g_2}\right),$$

wherein $g_1$ is an exposure ratio between the first and second images, wherein $g_2$ is an exposure ratio between the second and third images, and wherein fullscale is a scale of the imaging device.

8. The imaging device defined in claim 7, wherein the imaging device comprises an automobile imaging device and wherein the pixel signals $P_{lo}$ have an additional knee point K2p given by $$Kp_2 = \textit{fullscale} \cdot \left(2 + \frac{1}{g_2}\right).$$

* * * * *